United States Patent
Pritchett

(10) Patent No.: US 11,120,611 B2
(45) Date of Patent: Sep. 14, 2021

(54) USING BOUNDING VOLUME REPRESENTATIONS FOR RAYTRACING DYNAMIC UNITS WITHIN A VIRTUAL SPACE

(71) Applicant: Microsoft Technology Licensing, LLC, Redmond, WA (US)

(72) Inventor: Joel Stephen Pritchett, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/548,700

(22) Filed: Aug. 22, 2019

(65) Prior Publication Data
US 2021/0056748 A1  Feb. 25, 2021

(51) Int. Cl.
*G06T 15/06*  (2011.01)
*G06T 7/70*  (2017.01)
(Continued)

(52) U.S. Cl.
CPC ............... *G06T 15/08* (2013.01); *G06T 7/20* (2013.01); *G06T 7/60* (2013.01); *G06T 7/70* (2017.01);
(Continued)

(58) Field of Classification Search
None
See application file for complete search history.

(56) References Cited

U.S. PATENT DOCUMENTS 6,219,060 B1 * 4/2001 Ludke ................ G06T 15/08
345/424
7,126,605 B1 10/2006 Munshi et al.
(Continued)

FOREIGN PATENT DOCUMENTS

CN  109215106 A  1/2019
EP  0784831 A1  7/1997
(Continued)

OTHER PUBLICATIONS

Carr, et al., "Fast GPU Ray Tracing of Dynamic Meshes using Geometry Images", In Proceedings of the Graphics Interface Conference, Jun. 7, 2006, 7 Pages.
(Continued)

*Primary Examiner* — Tapas Mazumder
(74) *Attorney, Agent, or Firm* — Ray Quinney & Nebeker; James Bullough

(57) ABSTRACT

The present disclosure relates to systems, methods, and computer-readable media to efficiently render movable three-dimensional objects within a virtual space. For example, systems disclosed herein may identify a voxel representation of a three-dimensional unit that includes voxel volumes associated with bones from a bone structure of the three-dimensional unit. The systems described herein may further maintain a voxel index including pixel data mapped to corresponding bones and voxel volumes for use in rendering pixels of a pixel space. The systems described herein may utilize raytracing to render an identified voxel representation based on pixel data from the voxel index. The systems disclosed herein may significantly reduce expense of processing resource over conventional rendering methods that involve transforming thousands of vertices of three-dimensional mesh models.

19 Claims, 8 Drawing Sheets

(51) Int. Cl.
*G06T 15/08* (2011.01)
*G06T 7/20* (2017.01)
*G06T 7/60* (2017.01)
*G06T 13/40* (2011.01)
*G06T 15/20* (2011.01)
*G06T 17/20* (2006.01)

(52) U.S. Cl.
CPC .............. *G06T 13/40* (2013.01); *G06T 15/06* (2013.01); *G06T 15/20* (2013.01); *G06T 17/20* (2013.01); *G06T 2210/36* (2013.01)

(56) References Cited

U.S. PATENT DOCUMENTS

| | | | |
|---|---|---|---|
| 8,963,918 | B2 | 2/2015 | Zhou et al. |
| 9,536,338 | B2 | 1/2017 | Chen et al. |
| 2004/0091143 | A1* | 5/2004 | Hu .............................. G06T 7/13 382/154 |
| 2010/0289799 | A1 | 11/2010 | Hanika et al. |
| 2011/0148875 | A1* | 6/2011 | Kim ........................ G06T 13/40 345/420 |
| 2014/0247264 | A1* | 9/2014 | Sundberg .............. G06T 11/006 345/424 |
| 2018/0014732 | A1* | 1/2018 | Sekiya ................. A61B 5/4848 |
| 2019/0180499 | A1* | 6/2019 | Caulfield ................ G06T 15/06 |
| 2020/0054398 | A1* | 2/2020 | Kovtun ................... G06T 19/20 |

FOREIGN PATENT DOCUMENTS

| | | |
|---|---|---|
| WO | 2009091571 A1 | 7/2009 |
| WO | 2017127173 A1 | 7/2017 |
| WO | 2018033508 A1 | 2/2018 |

OTHER PUBLICATIONS

Eisemann, et al., "Automatic Creation of Object Hierarchies for Ray Tracing of Dynamic Scenes", In Technical Report Jun. 1, 2006, Jun. 12, 2006, 18 Pages.

Maule, et al., "Transparency and Anti-Aliasing Techniques for Real-Time Rendering", In Proceedings of the 25th SIBGRAPI Conference on Graphics, Patterns and Images Tutorials, Aug. 22, 2012, 10 Pages.

Wald, et al., "Ray Tracing Deformable Scenes using Dynamic Bounding Volume Hierarchies", In Journal of ACM Transactions on Graphics, vol. 26, Issue 1, Jan. 1, 2007, 28 Pages.

Wyvill, et al., "Warping as a Modelling Tool for CSG/Implicit Models", In Proceedings of International Conference on Shape Modeling and Applications, Mar. 3, 1997, 9 Pages.

Laine, et al., "Efficient Sparse Voxel Octrees", In Journal of IEEE Transactions on Visualization and Computer Graphics, vol. 17, No. 8, Aug. 2011, pp. 1048-1059.

"International Search Report and Written Opinion Issued in PCT Application No. PCT/US20/037830", dated Nov. 30, 2020, 13 Pages.

\* cited by examiner

USING BOUNDING VOLUME REPRESENTATIONS FOR RAYTRACING DYNAMIC UNITS WITHIN A VIRTUAL SPACE

BACKGROUND

Recent years have seen a precipitous rise in the use of computing devices (e.g., mobile devices, personal computers) to receive, store, edit, generate, or otherwise display digital media. For example, it is now common for consumer electronic devices to render high resolution video game content including high levels of detail and using a variety of rendering techniques. Moreover, as computing devices have become more complex and display capabilities have improved, more complex rendering techniques and higher detailed models for digital objects are becoming more common when generating and displaying various types of media content.

Many conventional rendering systems have attempted to render digital media content using various raytracing techniques. Indeed, raytracing has become a popular technique for rendering visual images within a three-dimensional computer graphic environment. Raytracing and other techniques for rendering three-dimensional objects, however, are often computationally prohibitive. For example, where three-dimensional objects are moving within a virtual environment, computing devices often lack processing capabilities to render a high-quality display of the movable objects within the virtual environment.

Moreover, even where computing devices may have the capability to render images or video using raytracing or other rendering techniques, rendering digital content within a virtual space becomes increasingly complex and prohibitive where a virtual environment includes a high number of three-dimensional objects and/or where the three-dimensional objects move within the virtual environment. As an example, in a gaming environment that includes any number of units or characters that are constructed using three-dimensional mesh models having hundreds or thousands of transformable triangles and vertices, conventional processors and/or graphics processing units (GPUs) are often incapable of effectively processing movements and transformations of the three-dimensional units while providing images at a threshold level of quality and/or at an acceptable frame rate.

These and other problems exist with regard to rendering digital content that includes three-dimensional units therein.

DETAILED DESCRIPTION

Figure 1:
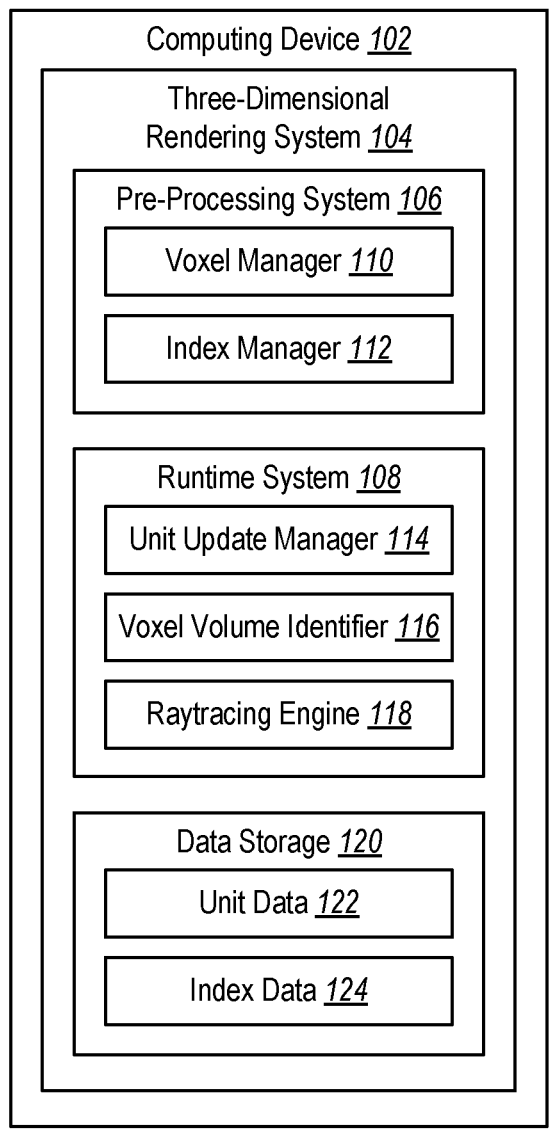
FIG. 1 illustrates an example environment including a three-dimensional unit rendering system in accordance with one or more embodiments.

The present disclosure relates generally to a three-dimensional rendering system (or simply "rendering system") for generating one or more bounding volume representations (e.g., voxel representations, bounding volume hierarchy (BVH) representations) for a three-dimensional unit that is movable within a virtual space and rendering a display of the three-dimensional unit from the perspective of a reference point (e.g., a virtual camera) within the virtual space. As will be discussed in further detail below, the rendering system can identify a bounding volume representation for a dynamic three-dimensional unit that includes bounding volumes (e.g., voxel volumes) corresponding to segments from a structure of the three-dimensional unit. The rendering system can further maintain a volume index including pixel values for the respective volumes that make up the bounding volume representation. Moreover, the rendering system can render a display of the three-dimensional object by raytracing pixels of a pixel space based on pixel values from the index and from a perspective of a reference point within the virtual space.

As will be discussed in further detail below, the present disclosure includes a number of practical applications that provide benefits and/or solve problems associated with rendering movable three-dimensional units within a virtual environment. For example, as mentioned above, the rendering system can identify a voxel representation for a three-dimensional unit. The voxel representation may be based on a more detailed three-dimensional mesh model that includes hundreds or thousands of polygonal (e.g., triangle) faces, edges, and vertices. In addition, the voxel representation may include voxel volumes corresponding to respective bones that further define a structure of the three-dimensional unit.

One or more examples described herein will be discussed specifically in connection with voxel representations and voxel volumes that make up the voxel representations for a three-dimensional unit. Features and functionality in connection with the voxel representations and voxel volumes, however, may similarly apply to other types of bounding volume representations (e.g., BVH representations) or raytracing compatible acceleration structures. Accordingly, while one or more embodiments described herein are described specifically in connection with voxel-based structures, other types of bounding volume representations and/or raytracing compatible acceleration structures may be used in connection with examples described and illustrated herein.

As will be discussed in further detail below, the voxel representation may include a plurality of voxel volumes corresponding to segments that define interconnected segments of the three-dimensional unit. For example, in one or more embodiments, the rendering system may identify a volume (e.g., a rectangular prism) that encompasses each vertex of a mesh model affected by a corresponding bone of a bone structure for the unit. In particular, where movement of a bone or rotation of the bone relative to an adjacent bone causes vertices and/or faces of the mesh model to transform, the rendering system can generate a voxel volume that encompasses the affected vertices and edges of the mesh model. The rendering system can generate voxel volumes for each bone of the mesh model to generate a voxel representation that includes a voxel volume for each bone of the three-dimensional unit.

In addition to generating and/or identifying a voxel representation for the three-dimensional unit, the rendering system can additionally generate and/or maintain a volume index (e.g., a voxel index) including pixel data for corresponding voxel volumes from the voxel representation. For example, the three-dimensional unit can include pixel data indicating pixel values for corresponding voxel volumes and/or corresponding bones. In addition, where the voxel volume includes voxel blocks that collectively make up the voxel volume, the voxel index may include pixel values for the corresponding voxel blocks. Indeed, in one or more embodiments, the voxel volume may include a two-dimensional texture that wraps around the voxel volume and which includes pixel values (e.g., color values, brightness values) for voxel blocks that cover a surface of a corresponding voxel volume. As will be discussed in further detail below, the voxel index may be used when raytracing pixels that are touched or otherwise affected by the corresponding voxel volume.

In one or more embodiments, the rendering system maintains or generates a plurality of voxel representations for the three-dimensional unit. In particular, the three-dimensional unit can generate any number of voxel representations having varying degrees of granularity (e.g., varying levels of detail) to be selected or identified based on a location of the three-dimensional unit within a virtual space. For example, where a three-dimensional unit would appear far away from a reference point from which a raytracing engine emits rays for rendering pixels of a pixel space, the rendering system may utilize a smaller voxel representation having a lower granularity than when the three-dimensional unit would appear closer to the reference point. In one or more embodiments, the rendering system identifies a voxel representation from a plurality of voxel representations based on a ratio between how many pixels the three-dimensional unit would occupy in a pixel space and how many voxel blocks and/or voxel volumes would appear within the pixels of the pixel space.

As will be discussed in further detail below, the rendering system utilizes a variety of techniques to fill pixels of a pixel space based on the voxel representations and corresponding pixel values from voxel indices. For example, as mentioned above, the rendering system can selectively identify a voxel representation from a collection of multiple voxel representations based on a projected size of the three-dimensional unit when rendered within a pixel space. As another example, the rendering system may consider overlapping voxel volumes from different three-dimensional units (or from the same unit) in determining a pixel value to write for one or more pixels of the pixel space. As a further example, the rendering system may selectively determine whether to raytrace pixels based on pixel data associated with voxel volumes in accordance with one or more embodiments described herein or, alternatively, to simply raytrace or otherwise render pixels for a three-dimensional unit based on a triangular mesh model.

As mentioned above, features and functionality of the rendering system described herein provide one or more benefits and overcome problems associated with rendering high-quality images that include three-dimensional units within a virtual space. For example, by identifying and utilizing voxel representations to render pixels as an alternative to rendering pixels based on conventional polygonal (e.g., triangular) mesh models, a computing device may utilize significantly fewer processing resources in providing a display of an image. In particular, where conventional systems may employ an expensive process of transforming edges and vertices of a mesh model for each three-dimensional unit that appears within each image frame, the rendering system may expend fewer processing resources by processing movement of voxel volumes based on tracked movement of corresponding bones of the three-dimensional unit.

The rendering system may further enhance processing efficiency when rendering an image by identifying different voxel representations depending on a size or number of pixels that a three-dimensional unit is expected to occupy within a pixel space. For example, where a three-dimensional unit is small and would only occupy a few pixels, the rendering system may select a voxel representation commensurate in granularity (e.g., resolution of voxel boxes) to a number of pixels that the three-dimensional unit would occupy in the pixel space. In this way, the rendering system can avoid processing transformation of edges and vertices of a mesh model at each frame of a video where rendering a display of the transformed mesh model would only appear within a few pixels of the pixel space. Thus, in one or more embodiments described herein, the rendering system can do away with inefficient processing dedicated to details of a three-dimensional unit that would not appear with any clarity within an image frame.

In addition to selectively identifying a voxel representation from a plurality of potential voxel representations, the rendering system can selectively determine whether to render an image based on a voxel representation or a conventional mesh model. For example, as will be discussed below, where a three-dimensional unit would appear within a large portion of a pixel space or where the three-dimensional unit is within a threshold distance from a reference point within a virtual space, the rendering system may render a display of the three-dimensional unit based on the mesh model rather than utilizing a voxel representation. Alternatively, where the three-dimensional unit would appear within a small portion of the pixel space or where the three-dimensional unit is further than a threshold distance from the reference point within the virtual space, the rendering system may instead utilize the voxel representation and associated pixel data from the voxel index in accordance with one or more embodiments described herein. In this way, the rendering system may provide flexibility in rendering images to ensure that high quality content is displayed under a variety of conditions.

As illustrated in the foregoing discussion, the present disclosure utilizes a variety of terms to described features and advantages of the systems described herein. Additional detail is now provided regarding the meaning of some of these terms. As used herein, a "three-dimensional unit" may refer to a digital representation of any dynamic object that can move within a virtual space. The three-dimensional unit may correspond to a three-dimensional mesh model including any number of vertices and edges that define a structure of the three-dimensional unit. In one or more embodiments, a three-dimensional unit may include interconnected segments capable of moving and rotating about one another within the virtual space. For example, where a three-dimensional unit refers to a character (e.g., a virtual person), the character may include skeletal bones associated with segments or portions of a three-dimensional mesh model. Each of the bones may be independently movable and capable of rotating about connections between adjacent bones within a hierarchal set of bones that make up the three-dimensional unit. As will be discussed below, the bones may be associated with respective segments of the three-dimensional unit.

As used herein, a "virtual space" refers to a virtual environment within which three-dimensional units are capable of moving. For example, a virtual space may refer to a gaming environment in which three-dimensional characters can move from location to location within the gaming environment. A two-dimensional display within the virtual space may be referred to as a pixel space (e.g., an image plane) indicating a field of view as seen from the perspective of a reference point (e.g., a virtual camera). For example, a virtual camera or raytracing reference point may generate a pixel space including an array of pixels that show content as seen from the perspective of the virtual camera. This may be done using conventional raytracing rendering techniques in which an image is generated by tracing a path of light from a reference point to fill pixels of a pixel space and simulating an image as it would appear from the point of view of the reference point within the virtual space.

The virtual space may refer to a variety of virtual environments. For example, in one or more embodiments, the virtual space refers to a digital representation of a three-dimensional space. This may include a digital space as viewed through a graphical user interface, virtual reality (VR) interface, or other interface that provides a display of computer-generated digital content. In one or more embodiments, the virtual space refers to an augmented reality (AR) space including a combination of real-world and digital elements. For example, a virtual space may include a combination of three-dimensional images provided in connection with or that are capable of interacting with real-world elements as viewed from a perspective of a client device (e.g., a mobile device, a wearable device). While one or more embodiments described herein include examples specific to digital spaces as viewed through a graphical user interface, features and functionality described herein in connection with rendering or displaying content from a perspective of a reference point may similarly refer to any type of virtual space.

As used herein, a "voxel representation" refers to a digital model for a three-dimensional unit that includes volumes associated with respective segments (e.g., bones) of the three-dimensional unit. For example, a voxel representation may include a plurality of voxel volumes including rectangular prisms or three-dimensional polygons that encompass corresponding segments of the three-dimensional unit. In one or more embodiments, a voxel volume refers to a rectangular or other polygonal bounding volume that encompasses each vertex of a select portion or segment of a mesh model that is affected (e.g., primarily affected) by a corresponding bone. For example, where an arm of a digital character includes two bones, the arm of the character may be represented by a first voxel volume that encompasses vertices of a first portion of the arm affected by a first bone and a second voxel volume that encompasses vertices of a second portion of the arm affected by a second bone. In one or more embodiments, voxel volumes do not overlap with other voxel volumes when the three-dimensional unit is in a base-pose or default position (e.g., a t-pose or bind pose). Alternatively, voxel volumes may overlap with other voxel volumes where generating a voxel representation involves allowing vertices that are affected by two or more bones to be encompassed within two different voxel volumes.

As will be discussed in further detail by way of example below, a voxel representation may include a plurality of voxel volumes and associated voxel blocks. As used herein, the voxel blocks may refer to building blocks that make up a structure of the three-dimensional unit within a boundary defined by the corresponding voxel volume. In one or more embodiments, the voxel blocks may refer to a grid of blocks around a surface of the voxel volume that defines a two-dimensional texture mapping for a surface of the corresponding voxel volume. The voxel blocks may have a granularity or level of detail for a corresponding voxel volume based on an expected size of the voxel representation when rendered within a pixel space. For example, where a display of a three-dimensional unit occupies less than a threshold number of pixels within a pixel space, an identified first voxel representation may include voxel volumes having few voxel blocks corresponding to a low granularity or level of detail. Alternatively, where a display of the three-dimensional unit occupies more than the threshold number of pixels within the pixel space, a second identified voxel representation may include voxel volumes having more voxel blocks corresponding to a higher granularity of level of detail than voxel blocks from the first voxel representation.

As mentioned above, while one or more embodiments described herein relate specifically to raytracing pixels using voxel representations, voxel volumes, voxel blocks, and corresponding pixel values from a voxel index, features and functionality discussed in connection with the specific examples and embodiments may similarly apply to other types of bounding volume representations for three-dimensional units. For example, a bounding volume representation may refer to a BVH representation including bounding boxes and associated building blocks bound to corresponding segments of interconnected segments of a dynamic three-dimensional structure. Accordingly, while one or more embodiments and illustrated examples are described in terms of voxel volumes and corresponding components, other types of representations and associated building blocks may also be used to accomplish one or more of the benefits related to efficiently raytracing pixels and rendering displays of three-dimensional units accomplished using voxel representations discussed herein.

Additional detail will now be provided regarding systems for rendering digital content that includes three-dimensional units within a virtual space. For example, FIG. 1 illustrates an example computing device 102 including a three-dimensional rendering system 104 (or simply "rendering system 104") implemented thereon in accordance with one or more embodiments described herein. As shown in FIG. 1, the rendering system 104 includes a pre-processing system 106 and a run-time system 108. The pre-processing system 106 may include a voxel manager 110 and an index manager 112. Further, the run-time system 108 may include a unit update manager 114, a voxel volume identifier 116, and a raytracing engine 118. As further shown, the computing device 102 may include a data storage 120 having unit data 122 and index data 124 stored thereon.

The computing device 102 may refer to various types of computing devices. For example, the computing device 102 may refer to a mobile device such as a mobile telephone, a smart phone, a personal digital assistant (PDA), a tablet, a laptop, or a wearable computing device (e.g., headset).

Additionally, or alternatively, the computing device 102 may include one or more non-mobile devices such as a desktop computer, a server device, or other non-portable device. In one or more implementations, the computing device 102 includes a display device capable of providing a display of a graphical user interface. In addition, or as an alternative, the computing device 102 may be communicatively coupled (e.g., wired or wirelessly) to a display device having a graphical user interface thereon for providing a display of digital content (e.g., gaming content). In one or more embodiments, the computing device 102 is an AR device capable of providing a display of digital elements in combination with real-world elements. The computing device 102 may include additional features and functionality described below in connection with FIG. 8.

FIG. 1 illustrates an example embodiment in which the rendering system 104 and associated components are implemented on a single computing device 102. Nevertheless, it will be understood that the rendering system 104 and/or the data storage 120 may be implemented on a single device or across multiple devices. For instance, in one or more embodiments, the rendering system 104 includes components implemented across a combination of a client device (e.g., a consumer electronic device) and one or more server devices. As an example, in one or more embodiments, the pre-processing system 106 may be implemented on a first device (e.g., one or more server devices) while the run-time system 108 is implemented on a second device (e.g., a client device). Moreover, while the data storage 120 may be implemented on the same device or system of devices as one or more components of the rendering system 104, the data storage 120 may similarly be implemented on a different device (e.g., one or more server devices) as the rendering system 104.

In one or more embodiments, each of the components of the rendering system 104 are in communication with one another using any suitable communication technologies. Additionally, the components of the rendering system 104 may be in communication with one or more other devices. It will be recognized that although the components of the rendering system 104 shown in FIG. 1 are shown to be separate in FIG. 1, any of the subcomponents may be combined into fewer components, such as into a single component, or divided into more components as may serve a particular embodiment.

The components of the rendering system 104 can include software, hardware, or both. For example, the components of the rendering system 104 can include one or more instructions stored on a computer-readable storage medium and be executable by processors of one or more computing devices. When executed by the one or more processors, the computer-executable instructions of the rendering system 104 can cause the computing device 102 to perform the methods described herein. Alternatively, the components of the rendering system 104 can comprise hardware, such as a special-purpose processing device to perform a certain function or group of functions. Additionally, or alternatively, the components of the rendering system 104 can include a combination of computer-executable instructions and hardware.

In accordance with one or more examples discussed above, components of the rendering system 104 may cooperatively provide a display based on a point of view of a reference point within a virtual space (e.g., a virtual gaming environment). In one or more embodiments, the rendering system 104 performs a series of acts as part of a pre-processing stage. For example, as part of installing an application or creating the framework of a virtual space, the rendering system 104 may utilize the pre-processing system 106 and associated components to perform acts of a pre-processing stage that involves creating the virtual environment and building data objects and associated models prior to initiating runtime of the application.

As shown in FIG. 1, the pre-processing system 106 includes a voxel manager 110. The voxel manager 110 may perform one or more acts in connection with voxel representations for one or more three-dimensional units capable of moving about a virtual space. For example, in one or more embodiments, the voxel manager 110 generates a plurality of voxel representations for a three-dimensional unit. In particular, the voxel manager 110 may generate one or multiple voxel representations for each type of three-dimensional unit that is included or may be included within a display of the virtual space. For instance, where a gaming application includes a variety of three-dimensional characters capable of moving about a virtual environment, the voxel manager 110 can generate one or more voxel representations for each of the variety of three-dimensional characters. The voxel manager 110 can generate a voxel representation in a variety of ways. Additional detail in connection with generating a voxel representation is discussed in connection with FIG. 2 below.

The voxel manager 110 may additionally generate any number of voxel representations. For example, the voxel manager 110 can generate one or more voxel representations for different types of units having different bone structures and/or having different visual features. Moreover, the voxel manager 110 can generate multiple voxel representations for an individual three-dimensional unit. In particular, the voxel manager 110 can generate voxel representations having different levels of granularity (e.g., different levels of detail and/or numbers of voxel blocks) based on a size of the voxel representation when rendered within a pixel space. Additional detail in connection with generating multiple voxel representations is discussed in connection with FIG. 3 below.

In one or more embodiments, the voxel manager 110 further identifies or maintains criteria for identifying a voxel representation to use in rendering a display of the three-dimensional unit within a pixel space. For example, the voxel manager 110 may indicate rules such as a number of pixels or a distance from a reference point to use in selectively identifying which of a plurality of voxel representations to use when raytracing pixels of a pixel space. As another example, the voxel manager 110 may indicate rules associated with processing capabilities of the computing device 102 in determining which of the voxel representations to use when rendering pixels of a pixel space. The voxel manager 110 may further generate rules in determining whether to render pixels based on a voxel representation or a three-dimensional mesh model.

As mentioned above, and as further shown in FIG. 1, the pre-processing system 106 includes an index manager 112. The index manager 112 may generate and/or maintain a voxel index for one or more voxel representations. As used herein, a voxel index may refer to any data structure (e.g., a table, database) that includes pixel data associated with corresponding voxel representations. For example, a voxel index may include mapping information between voxel volumes (and/or bones) of a voxel representation and associated pixel values. The voxel index may include pixel data such as color values, brightness values, opacity values, reflection data, shading data, or any other data that may be used to render a pixel within a pixel space for any pixels that a voxel volume touches or otherwise occupies within a pixel space. In one or more embodiments, the index manager 112 generates or otherwise maintains a voxel index including different pixel data for different voxel representations. Further detail in connection with generating voxel indices for respective voxel representations is discussed below in connection with FIG. 3.

In one or more embodiments, the voxel index(es) is maintained locally on the computing device 102. For example, in one or more embodiments, the index manager 112 generates and stores voxel indices on the data storage 120 of the computing device 102. Alternatively, in one or more embodiments, the computing device 102 receives voxel indices from another device (e.g., a server device) and stores the voxel indices on the data storage 120. In one or more implementations, the index manager 112 may remotely access voxel indices stored or otherwise maintained on one or more additional devices.

As mentioned above, in one or more implementations, acts associated with generating voxel representations and associated voxel indices are performed as part of a pre-processing stage. In one or more embodiments, these acts are performed locally using processing resources of the computing device 102. Alternatively, in one or more implementations, a server device or system of devices (e.g., a cloud computing system) may perform one or more pre-processing functions and provide voxel data and/or associated index data to the computing device 102 for use when initiating runtime for an application.

As shown in FIG. 1, the runtime system 108 includes a unit update manager 114. Upon initiating runtime of an application, the unit update manager 114 may update animations within the virtual space. For example, the unit update manager 114 may identify initial or current positions of each three-dimensional unit within the virtual space. In addition, the unit update manager 114 may identify an initial or current position of a reference point (e.g., a virtual camera) within the virtual space.

The unit update manager 114 may further perform additional processing related to movement and position of units and reference points throughout operation of an application. For instance, the unit update manager 114 may continually update position and orientation data for any number of three-dimensional units within a virtual space. Moreover, the unit update manager 114 can continually update position, orientation, field of view, or other information associated with a position and/or direction of the reference point within the virtual space.

As further shown, the runtime system 108 includes a voxel volume identifier 116. Upon determining an initial or current position of a three-dimensional unit, the voxel volume identifier 116 may be used to determine or identify voxel volumes that are relevant to pixels of a pixel space. In one or more embodiments, the voxel volume identifier 116 identifies relevant bones for each pixel by rendering a screen-sized buffer corresponding to the pixel space including the voxel representations therein. More specifically, the voxel volume identifier 116 may render a screen-sized buffer including any voxel volumes that are visible within a field of view of a reference point at a current position and orientation within the virtual space.

The voxel volume identifier 116 may further identify relevant bones (e.g., a subset of bones from a corresponding bone structure that is visible from a reference point) and corresponding voxel volumes for each pixel of the pixel space. For example, the voxel volume identifier 116 may iterate through each pixel or a subset of pixels of a pixel space in view of the screen-sized buffer to identify pixels that one or more voxel volumes influence (e.g., touch or overlap) and associate a corresponding bone to the influenced pixels. For example, in one or more implementations, the voxel volume identifier 116 iterates through each pixel of a pixel space and indicates a relevant bone and/or voxel volume corresponding to any voxel volume that touches each pixel of the pixel space. Further detail in connection with identifying relevant bones for corresponding pixels will be discussed below in connection with FIG. 4.

As mentioned above, the voxel manager 110 may generate any number of voxel representations for a corresponding three-dimensional unit. In one or more implementations, the voxel volume identifier 116 may selectively identify which of the voxel representations to use in rendering a display of a three-dimensional unit within the pixel space. For example, the voxel volume identifier 116 may select a voxel representation based on a number of pixels that the voxel representation occupies within the pixel space. In one or more implementations, the voxel volume identifier 116 may determine to forego using the voxel representation altogether and instead utilize a mesh model in rendering the display.

The runtime system 108 may further include a raytracing engine 118. Upon identifying the relevant bones for each pixel of a pixel space, the voxel volume identifier 116 can provide relevant information and associated mapping information (e.g., voxel index information) to a raytracing engine 118 for determining and rendering pixel values for pixels of the pixel space. In one or more implementations, the voxel volume identifier 116 provides identified voxel volumes and associated pixel data for the pixel space to a raytracing engine 118 that employs a variety of conventional raytracing techniques. In particular, the raytracing engine 118 may iterate through the pixels of the pixel space to determine pixel values based in part on the identified bones for each pixel and associated pixel data from the voxel index(es).

In one or more embodiments, the raytracing engine 118 more efficiently raytraces pixels of a pixel space by marching rays through pixels of the pixel space and only considering hits against voxel spaces that have been indicated as relevant (e.g., visible). Moreover, in one or more embodiments, the raytracing engine 118 iterates through pixels of the pixel space only so long as no intersections of bones are detected or relevant bones left to iterate. In one or more embodiments, the raytracing engine 118 iterates through each pixel of the pixel space that a voxel volume touches and casts a single ray based on a corresponding pixel value from the voxel index.

In one or more embodiments, the raytracing engine 118 includes combination of multiple shading engines. For instance, in one or more embodiments, the raytracing engine 118 renders any voxel volumes that are visible to a reference point within a voxel space using traditional GPU vertex transform methods. The raytracing engine 118 may then replace the values rendered using the traditional GPU vertex transformation with a shader that performs raytracing through the visible voxel volumes based on pixel values from the corresponding voxel index to produce a high-quality display of the three-dimensional unit within a pixel space.

As further shown in FIG. 1, the computing device 102 includes a data storage 120 including unit data 122. The unit data 122 may include any information associated with three-dimensional units capable of moving about a virtual space. For example, the unit data 122 may include a three-dimensional mesh model and associated information (e.g., vertex, edges, and associated transformation data). The unit data 122 may additionally include any voxel model data including voxel representations and associated data.

As further shown, the data storage 120 may include index data 124. The index data 124 may include any pixel data associated with corresponding voxel representations. For example, the index data 124 may include pixel data for each voxel volume of each voxel representation. In addition, the index data 124 may include pixel data for each voxel block of corresponding voxel volumes. The index data 124 may include pixel values such as color values, brightness values, reflection values, opacity values, and any other information that may be used in filling a pixel value of a pixel space when rendering a display.

Figure 2:
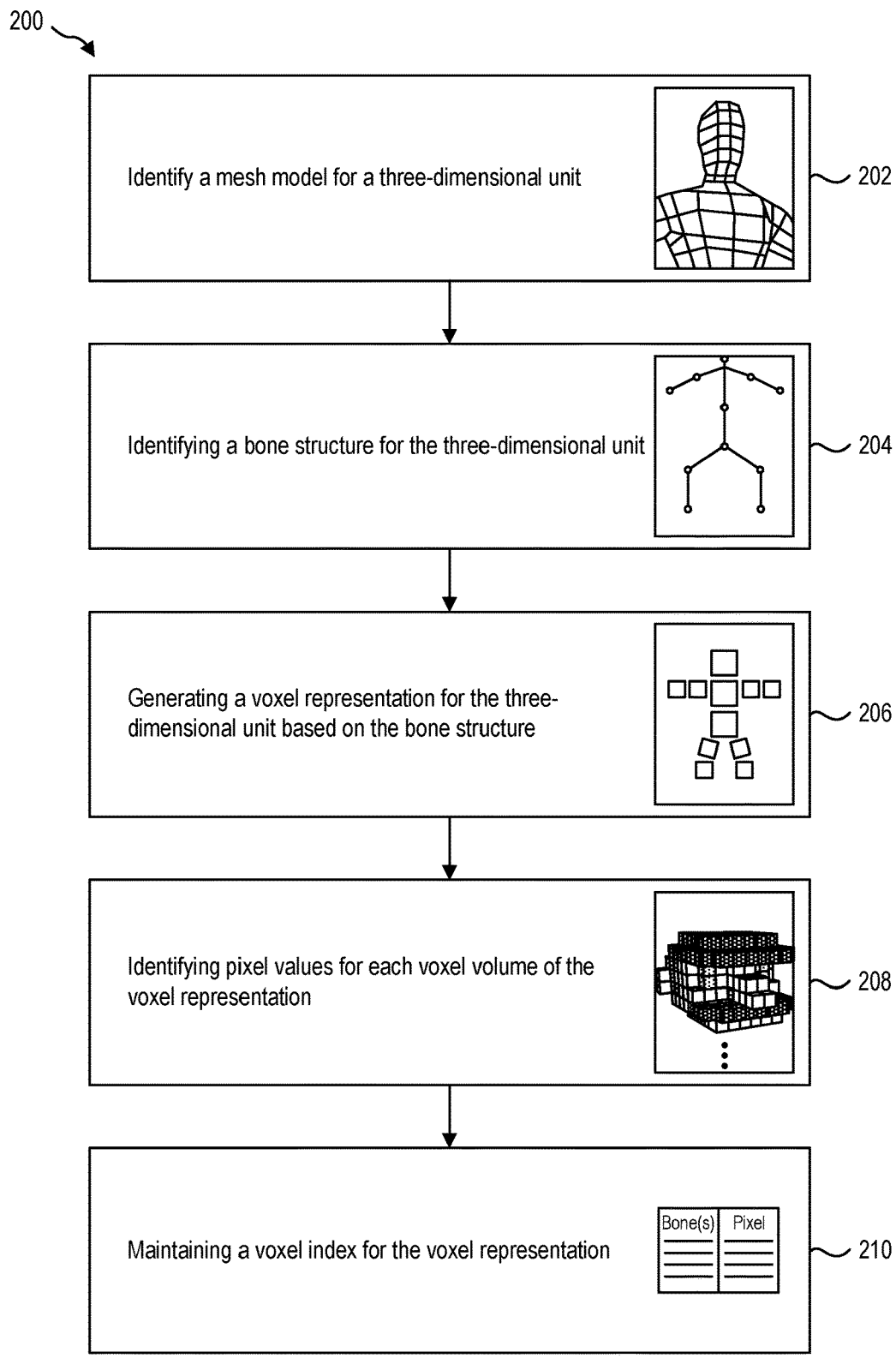
FIG. 2 illustrates an example workflow for pre-processing three-dimensional unit data in accordance with one or more embodiments.

Moving on, FIG. 2 provides an example workflow 200 indicating a series of acts for generating a voxel representation and maintaining a corresponding voxel index. For example, as shown in FIG. 2, the rendering system 104 may perform an act 202 of identifying a mesh model corresponding to a three-dimensional unit. In particular, the rendering system 104 may identify a mesh model for a three-dimensional unit including vertices and edges that represent a structure of a corresponding three-dimensional unit that may move about a virtual space (e.g., a virtual gaming space). In one or more embodiments described herein, the mesh model refers to a model for a digital character within a gaming application. Nevertheless, other mesh models associated with other types of three-dimensional units that are movable within any virtual environment may be utilized in conjunction with one or more embodiments of the rendering system 104 described herein.

Upon identifying the mesh model and/or three-dimensional unit, the rendering system 104 may perform an act 204 of identifying a bone structure for the three-dimensional unit. As discussed above, the rendering system 104 can identify a plurality of bones corresponding to a plurality of interconnected segments of the three-dimensional unit that define, at least in part, how the three-dimensional unit moves about the virtual space.

In one or more embodiments, the rendering system 104 identifies each vertex of the mesh model affected by or otherwise bound to movement of a corresponding bone. In one or more implementations, the rendering system 104 identifies, for each vertex of the mesh model, which bone is most closely associated with movement or transformation of the vertex when the three-dimensional unit moves throughout the virtual space. In one or more embodiments, each vertex is determined to correspond to a single bone. Alternatively, the rendering system 104 may determine that one or more vertices correspond to multiple bones.

In accordance with one or more embodiments discussed above, the rendering system 104 may further perform an act 206 of generating a voxel representation for the three-dimensional unit based on the identified bones. In particular, the rendering system 104 may generate voxel volumes corresponding to respective bones including bounding boxes (or other polygonal shapes) that encompass each vertex of the mesh model determined to correspond to the respective bones. In one or more embodiments, the rendering system 104 generates a voxel volume for each bone. Moreover, as discussed above, and as will be shown in further detail in FIG. 3, the rendering system 104 may generate any number of voxel representations for a corresponding three-dimensional unit.

In one or more embodiments, the voxel volumes of a given voxel representation do not overlap with other voxel volumes within a voxel representation. For instance, where a three-dimensional unit is in a default pose (e.g., a t-pose), the voxel volumes may come into contact or lie flat against adjacent voxel volumes. When out of the default pose, one or more of the voxel volumes may overlap with other voxel volumes. In one or more embodiments, voxel volumes may slightly overlap with adjacent voxel volumes even where the voxel representation is positioned in a default pose.

Upon identifying the voxel volumes, the rendering system 104 may additionally perform an act 208 of identifying pixel values for each voxel volume. In particular, the rendering system 104 may generate a texture including voxel blocks that cover a surface of the voxel volume and that include respective pixel values. A level of the detail of the voxel blocks may differ for each of the voxel representations associated with a corresponding three-dimensional model. For example, a first volume having a highest level of detail (e.g., a highest measure of granularity) of a plurality of voxel volumes may have significantly more voxel blocks than one or more additional volumes having lower level of detail (e.g., a lower measure of granularity).

As further shown in FIG. 2, the rendering system 104 may perform an act 210 of maintaining a voxel index for a corresponding voxel representation. As discussed above, the voxel index may include pixel data for corresponding voxel volumes of the voxel representation. For example, the voxel index may include color values, brightness values, and opacity values for each of the voxel volumes. In one or more implementations, the voxel index includes corresponding pixel data for each voxel block of the voxel volumes. Moreover, as discussed above, the rendering system 104 may maintain a voxel index for each voxel representation. Alternatively, the rendering system 104 may maintain a single voxel index for multiple voxel representations corresponding to the same three-dimensional unit.

Figure 3:
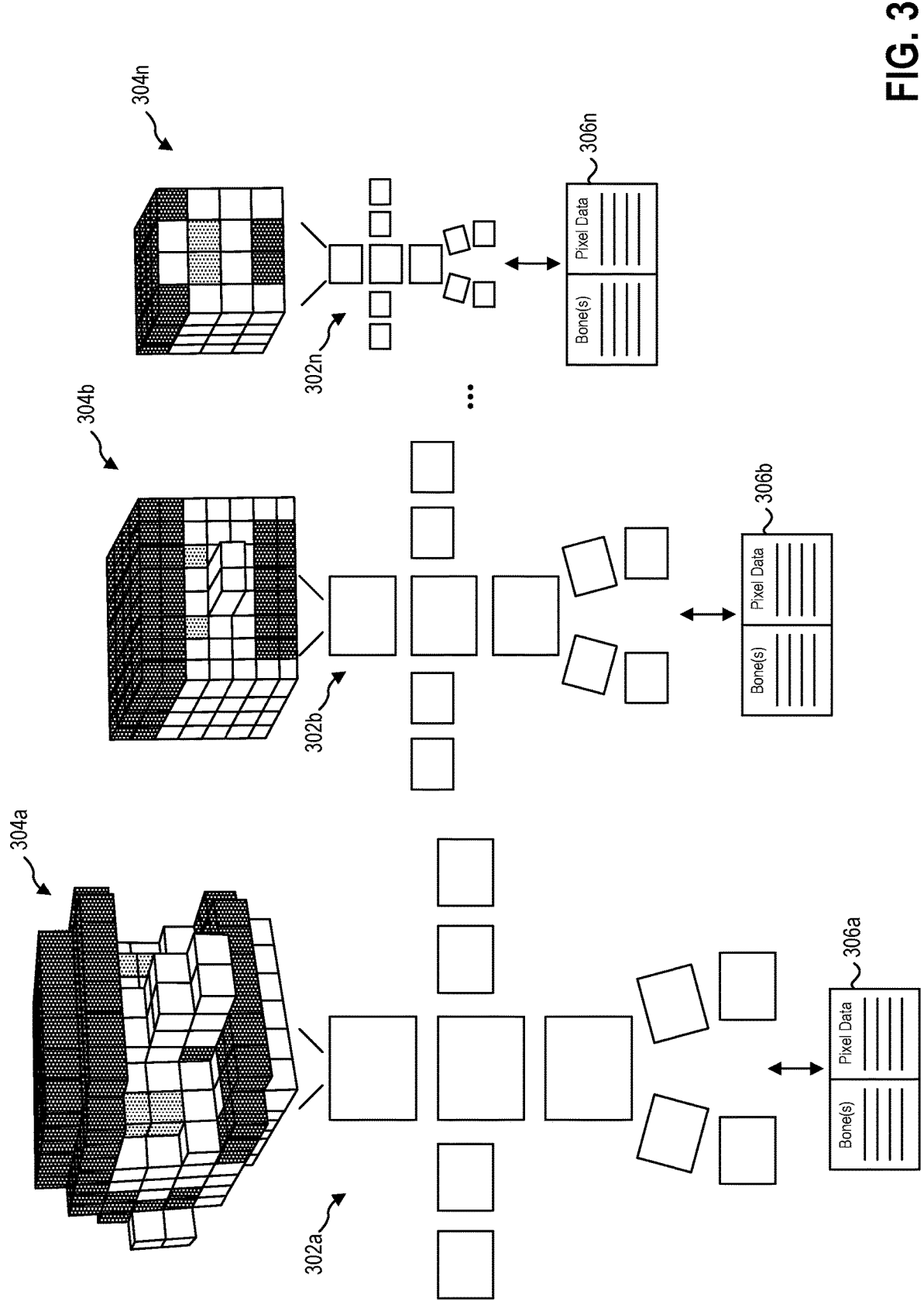
FIG. 3 illustrates an example workflow for generating a plurality of voxel representations and associated voxel indices for a three-dimensional unit in accordance with one or more embodiments.

As discussed above, the rendering system 104 may generate any number of voxel representations for a corresponding three-dimensional unit. FIG. 3 illustrates an example implementation that includes multiple voxel volumes 302*a-n* of varying sizes and having different levels of voxel granularity. For example, FIG. 3 illustrates a first voxel representation 302*a* having a high degree of granularity of voxel boxes relative to other voxel representations 302*b-n*. FIG. 3 additionally illustrates a second voxel representation 302*b* having a corresponding degree of granularity of voxel boxes lower than the granularity for the first voxel representation 302*a*. Moreover, FIG. 3 illustrates an nth voxel representation 302*n* including a low degree of granularity relative to other voxel representations (e.g., voxel representation 302*a-b*) shown in FIG. 3. As mentioned above, the rendering system 104 can generate any number of voxel representations having a wide variety of granularity of voxel boxes.

By way of example and not limitation, FIG. 3 additionally illustrates example voxel volumes 304*a-n* associated with corresponding bones of a bone structure for the voxel representations 302*a-n*. As shown in FIG. 3, the textures of the corresponding voxel volumes have varying degrees of granularity relative to one another. In the example shown in FIG. 3, the voxel volumes 304*a*-n each illustrate textures having varying numbers of voxel boxes and having different levels of detail.

In generating the different voxel representations 302*a-n*, the rendering system 104 may determine levels of detail to include in subsequent versions of the voxel representations 302*a-n* in a variety of ways. For example, in one or more implementations, the most detailed voxel representation is generated first. A second voxel volume may then be generated based on the first voxel representation at half the size of the first voxel volume. In particular, the second voxel volume may have half the width, height, and depth as the first voxel volume. To accomplish this, the rendering system 104 may merge eight voxel blocks into a single block from the first version to the second version of the voxel representation. This may include adding pixel values and then averaging based on a number of voxel blocks combined. In one or more embodiments, the rendering system 104 merges voxel blocks at a different rate (e.g., other than an 8:1 ratio). The rendering system 104 may similarly generate any number of iterations of the voxel representations in a similar fashion until a final voxel representation includes a single pixel block (or other minimum number of voxel blocks).

As mentioned above, and as further illustrated in FIG. 3, the rendering system 104 may generate or otherwise maintain voxel indices 306a-n for corresponding voxel representations 302a-n. Each of the voxel indices 306a-n may include an identification of bones that make up the bone structure of the voxel representation. Each of the bone identifiers may be mapped to corresponding voxel volumes within the voxel representations 302a-n. For example, each of the voxel volumes 304a-n may correspond to a first bone of the voxel representations 302a-n. In addition, the voxel indices 306a-n may include pixel data (e.g., color values, brightness values, opacity values) corresponding to each of the bones. The pixel data may include general information about the pixels that make up the voxel volumes. In addition, or as an alternative, the pixel data may include information about each voxel block within a corresponding voxel volume.

Figure 4:
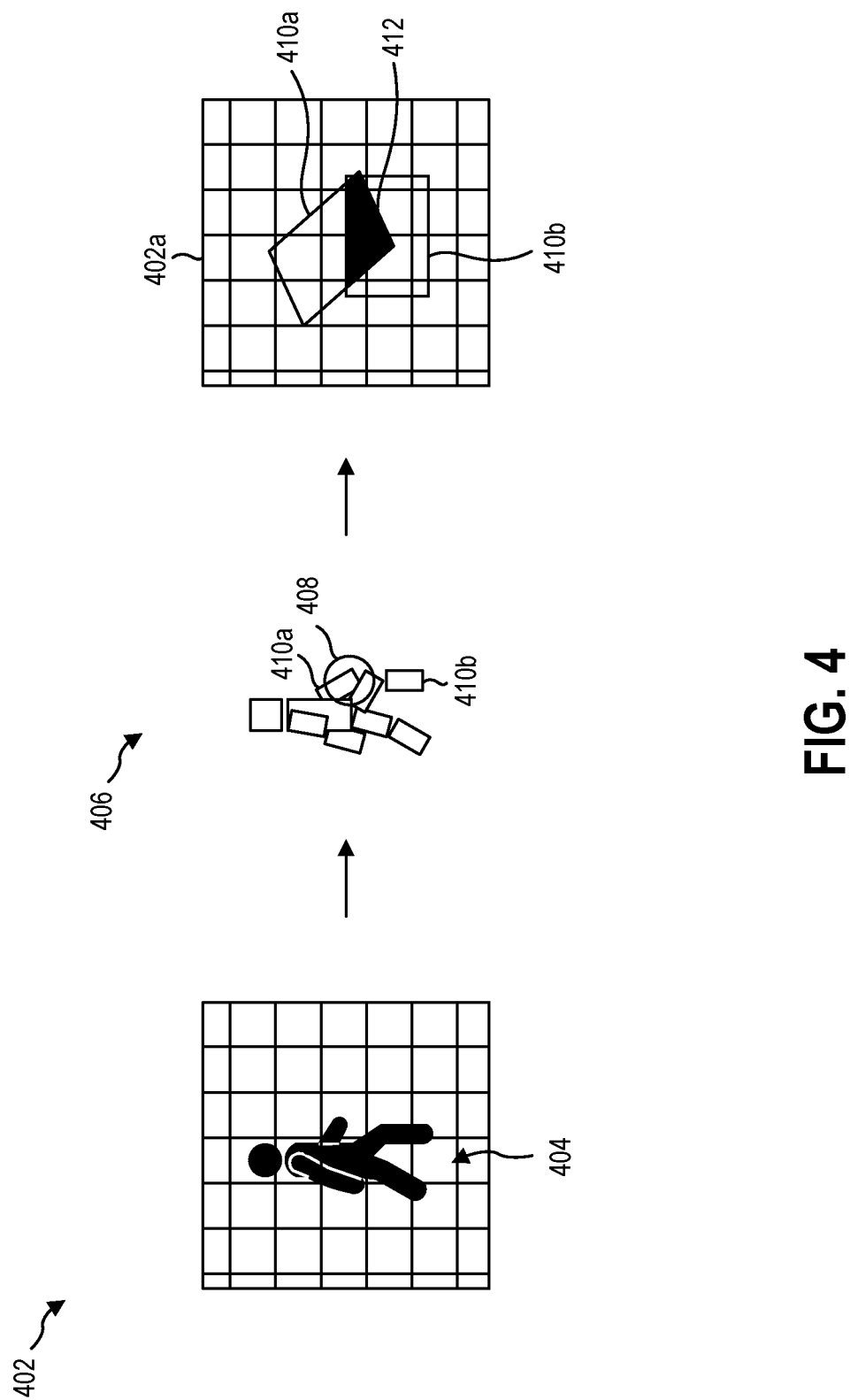
FIG. 4 illustrates an example implementation of the three-dimensional unit rendering system for raytracing pixels of an example pixel space in accordance with one or more embodiments.

FIG. 4 illustrates an example pixel space 402 having a three-dimensional unit 404 appearing therein. In particular, the pixel space 402 illustrates a current perspective (e.g., a two-dimensional field-of-view image) from a reference point (e.g., a virtual camera) within a virtual space that includes a view of the three-dimensional unit 404. As shown in FIG. 4, the pixel space 402 includes an array of pixels, which may have any number of pixels depending on a resolution of a display device, an identified resolution of an application, and/or capabilities of the computing device 102 rendering a display of the pixel space 402. As mentioned above, the pixel space 402 may refer to a display of pixels via a graphical user interface. In one or more embodiments, the pixel space 402 refers to a display of pixels via a VR interface, AR interface, or other display provided on a display device.

In accordance with one or more embodiments described herein, the rendering system 104 may identify a voxel representation 406 for the three-dimensional unit 404 that includes any number of voxel spaces corresponding to a bone structure of the three-dimensional unit (e.g., a mesh model of three-dimensional unit). As discussed above, identifying the voxel representation 406 may involve identifying the voxel representation 406 from a plurality of voxel representations based on a size of the three-dimensional unit relative to the pixel space 402. For example, the rendering system 104 may identify the voxel representation 406 based on a ratio of voxel spaces and/or voxel blocks to a number of pixels within the pixel space 402. For instance, where a voxel volume of a voxel representation occupies or touches only a single pixel (or other threshold number of pixels), the rendering system 104 may identify a voxel volume having a low degree of granularity. Alternatively, the rendering system 104 may identify a voxel volume having a higher degree of granularity where the voxel volumes occupy a higher number of pixels within the pixel space 402.

While one or more embodiments described above relate to voxel representations in a default or t-pose in which voxel volumes do not necessarily overlap, in one or more implementations, voxel volumes of the same voxel representation and/or from different voxel representations may overlap. For example, in the example shown in FIG. 4, the voxel representation includes a first voxel volume 410a corresponding to a first bone that overlaps with a second voxel volume 410b corresponding to a second bone. The overlapping portion 408 this includes two overlapping voxel volumes that may have different associated pixel values within a voxel index. While FIG. 4 illustrates an example in which two voxel volumes of the same voxel representation overlap, other implementations may involve two (or more) voxel volumes that overlap from different voxel representations corresponding to different three-dimensional units.

FIG. 4 further illustrates a pixel space portion 402a representing a portion of the pixel space 402 that includes a larger portion of the three-dimensional unit 404 visible therein. In particular, the pixel space portion 402a includes the first voxel volume 410a corresponding to the first bone and the second voxel volume 410b corresponding to the second bone and an overlapping portion 412 showing the overlap of voxel volumes 410a-b over one or more shared pixels.

As mentioned above, the rendering system 104 may identify a set of bones that are visible within a field of view of a reference point. In particular, the rendering system 104 may identify a subset of voxel volumes that one or more lines (e.g., traces) emitted from the reference point will touch within the pixel space 402. In one or more embodiments, this is performed by a compute shader that simply identifies which bones (e.g., a subset of bones from a single unit or multiple units) of a plurality of bones are relevant (e.g., visible) to a raytracing engine 118.

Also mentioned above, the rendering system 104 may indicate which voxel volumes are touching each of the pixels from the pixel space 402. Where only a single voxel volume touches a pixel from the pixel space 402, the rendering system 104 may simply tag or otherwise associate the pixel with a corresponding bone number. However, where multiple voxel volumes touch a pixel, as shown in the pixel space portion 402a of FIG. 4, the rendering system 104 may associate each of the bones of the voxel volumes 410a-b with the pixels over which the voxel volumes 410a-b overlap. Thus, in the example shown in FIG. 4, the pixels corresponding to the overlapping portion 412 may be tagged or otherwise associated with the bones of the first and second voxel volumes 410a-b.

The rendering system 104 may associate the pixels of the pixel space 402 in a variety of ways. For example, the rendering system 104 may associate bones with corresponding pixels using depth peeling or depth stacking technique. In one or more embodiments, the rendering system 104 determines a depth order for the bones of the overlapping portions. For example, if the first voxel volume 410a is closer to a reference point within the virtual space than the second voxel volume 410b, the rendering system 104 may indicate the depth order when associating the bones with the corresponding pixels.

In one or more embodiments, the rendering system 104 associates the bones with corresponding pixels within color channels. For instance, where a pixel includes four channels (e.g., CMYK channels, RGBA channels), the rendering system 104 can associate up to four overlapping bones with a corresponding pixel. In the example shown in FIG. 4, a first channel (e.g., a blue channel) may be associated with a first bone of the first voxel volume 410a while a second channel (e.g., a red channel) may be associated with a second bone of the second voxel volume 410b. Where only two voxel volumes overlap a given pixel, the third and fourth channels may remain blank. Alternatively, where more than four bones overlap a given pixel, the rendering system 104 may only indicate the four bones that are closest to the reference point within the virtual space.

In one or more embodiments, the rendering system 104 assigns bones to corresponding pixels based on opacity of the voxel blocks that a raytrace will touch when emitting rays from the reference point. For example, where a foremost voxel volume has zero percent opacity, the rendering system 104 may ignore any objects behind the foremost voxel volume since no objects behind the voxel volume would be visible to a raytracing engine 118. Alternatively, where one or more of the voxel volumes include an any degree of opacity, the rendering system 104 may associate each of the relevant bones to the corresponding pixels (up to four bones per pixel).

After associating pixels with corresponding bones of the three-dimensional unit 404, the rendering system 104 may provide the identified bones and/or voxel spaces to a raytracing engine 118. The rendering system 104 may additionally provide one or more voxel indices including mappings between bones and corresponding pixel data to the raytracing engine 118 for use in outputting pixel values for the pixels of the pixel space. In one or more embodiments, the rendering system 104 casts a single ray for every pixel touched by the voxel volumes (e.g., based on corresponding pixel values from the voxel index). Moreover, where multiple voxel volumes touch corresponding pixels, the rendering system 104 casts a single ray having a value based on a combination of pixel values from the voxel index corresponding to those bones that have been identified for the corresponding pixel(s).

In one or more embodiments, the rendering system 104 performs a combination of rendering based on a combination of traditional GPU transform methods and depth peeling techniques. For instance, the rendering system 104 can render each voxel volume to the pixel space 402 using traditional GPU vertex transform methods and using multiple passes (e.g., corresponding to a number of visible bones within the pixel space 402). Where pixels are passed multiple times, the rendering system 104 may write a bone identifier or pixel value to the pixels for as many overlapping objects are visible on the pixel (e.g., up to four or however many color channels exist for the pixel). Alternatively, the rendering system 104 may perform fewer passes to achieve higher performance or based on processing limitations of a device.

It will be understood that as the three-dimensional unit 404 moves about the virtual space and/or as a perspective of a reference point within the virtual space changes, the rendering system 104 may again repeat one or more processes described herein. Nevertheless, because movement of a voxel representation 406 about the virtual space does not involve transformation of vertices and edges, as would be the case with movement of a mesh model, the rendering system 104 may quickly identify pixel values using conventional raytracing techniques without spending considerable processing resources determining transformation of vertices of the mesh model for each displayed image frame. Moreover, the rendering system 104 may control the potential degradation of the image quality to a degree by selectively identifying or switching between voxel representations depending on a size of the three-dimensional unit 404 within the pixel space 402.

Figure 5:
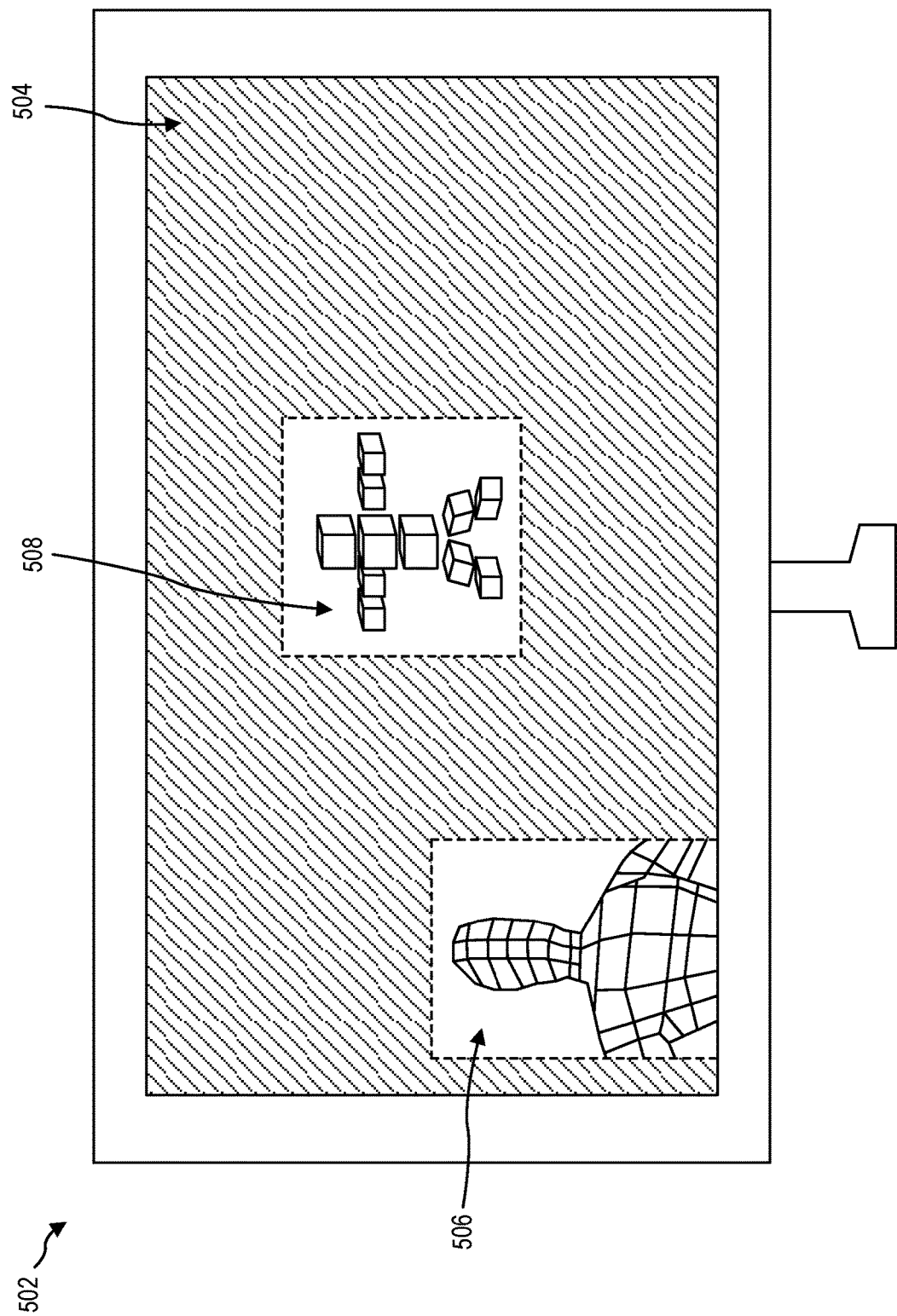
FIG. 5 illustrates an example implementation of the three-dimensional unit rendering system raytracing pixels of another example pixel space in accordance with one or more embodiments.

While one or more embodiments described herein involve identifying a voxel representation from a plurality of voxel representations associated with a corresponding three-dimensional unit, in one or more embodiments, the rendering system 104 may choose between a mesh model and a voxel representation in different circumstances. For example, FIG. 5 illustrates an example computing device 502 having a graphical user interface 504 for displaying a pixel space in accordance with one or more embodiments. The computing device 502 may be one example of the computing device 102 discussed above in connection with FIG. 1. Nonetheless, while FIG. 5 illustrates an example of a display provided via a graphical user interface 504 of a typical computing device 502, similar features and functionality may apply to a display provided via a VR interface, AR interface, or other type of display.

As shown in FIG. 5, the pixel space may include a first three-dimensional unit 506 (e.g., a portion of a three-dimensional unit 506) and a second three-dimensional unit 508. In this example, the rendering system 104 may identify a voxel representation and perform processes described herein for rendering a display of the voxel representation for the second three-dimensional unit 508. The rendering system 104 may identify or otherwise determine the voxel representation for the second three-dimensional unit 508 based on a size (e.g., number of occupied pixels) of the three-dimensional unit 508 when rendered within the pixel space.

In connection with the first three-dimensional unit 506, the rendering system 104 may instead determine that identifying a voxel representation for the first three-dimensional unit 506 may result in a pixelated image having a non-satisfactory number of image artifacts. As a result, the rendering system 104 may forego identifying a voxel representation and instead identify a mesh model used to construct the voxel representations and utilize the mesh model to generate and render the corresponding image. While rendering the pixels based on the mesh model may be more computationally expensive than utilizing the voxel representation, the rendering system 104 may nonetheless limit processing expense by selectively rendering pixels for one or more three-dimensional units (e.g., the second three-dimensional unit 508) using voxel representations and information from associated voxel indices rather than utilizing the mesh model for each three-dimensional unit that appears within a pixel space.

In accordance with one or more embodiments, the rendering system 104 may identify an appropriate model for a three-dimensional unit based on comparing a size of the three-dimensional unit as it would appear within a pixel space. For example, where the three-dimensional unit exceeds a first size or pixel threshold, the rendering system 104 may determine that utilizing the mesh model for the three-dimensional unit is needed to achieve a satisfactory level of image quality. Moreover, the rendering system 104 may compare an expected size of the three-dimensional unit within the pixel space against a plurality of threshold ranges corresponding to voxel representations and selectively identify a voxel representation associated with an identified threshold range to use in rendering pixels of the three-dimensional unit.

Figure 6:
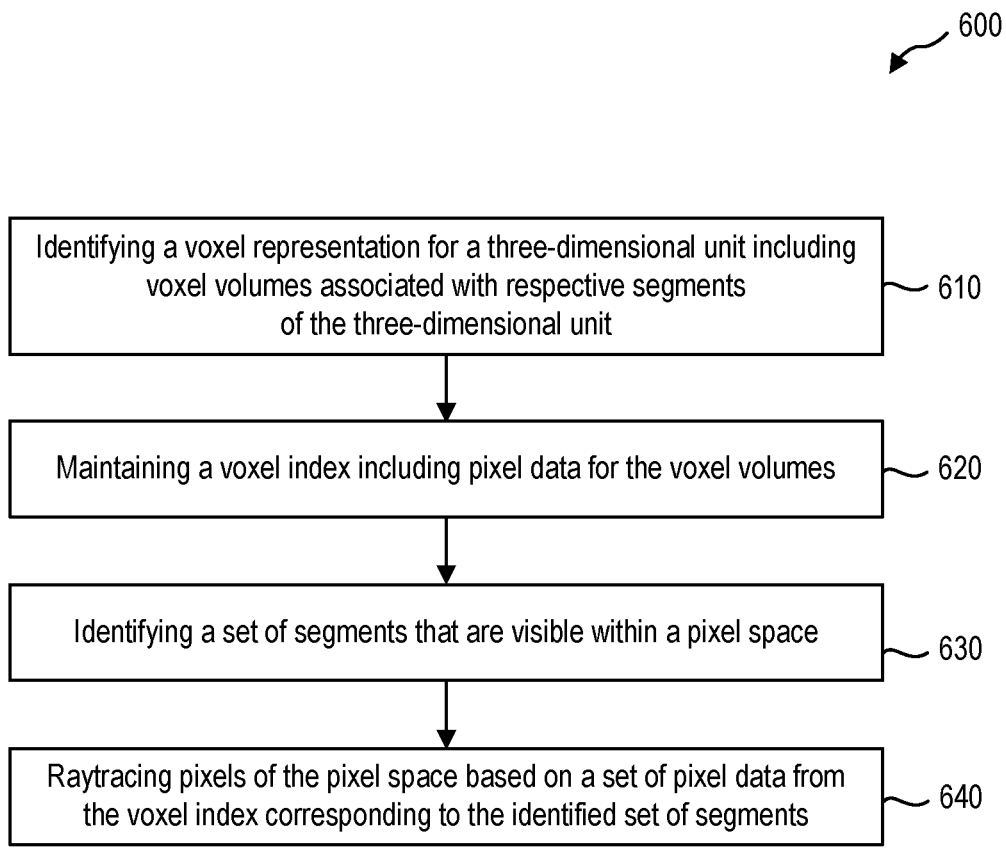
FIG. 6 illustrates an example series of acts for rendering three-dimensional units within a virtual space in accordance with one or more embodiments.
Figure 7:
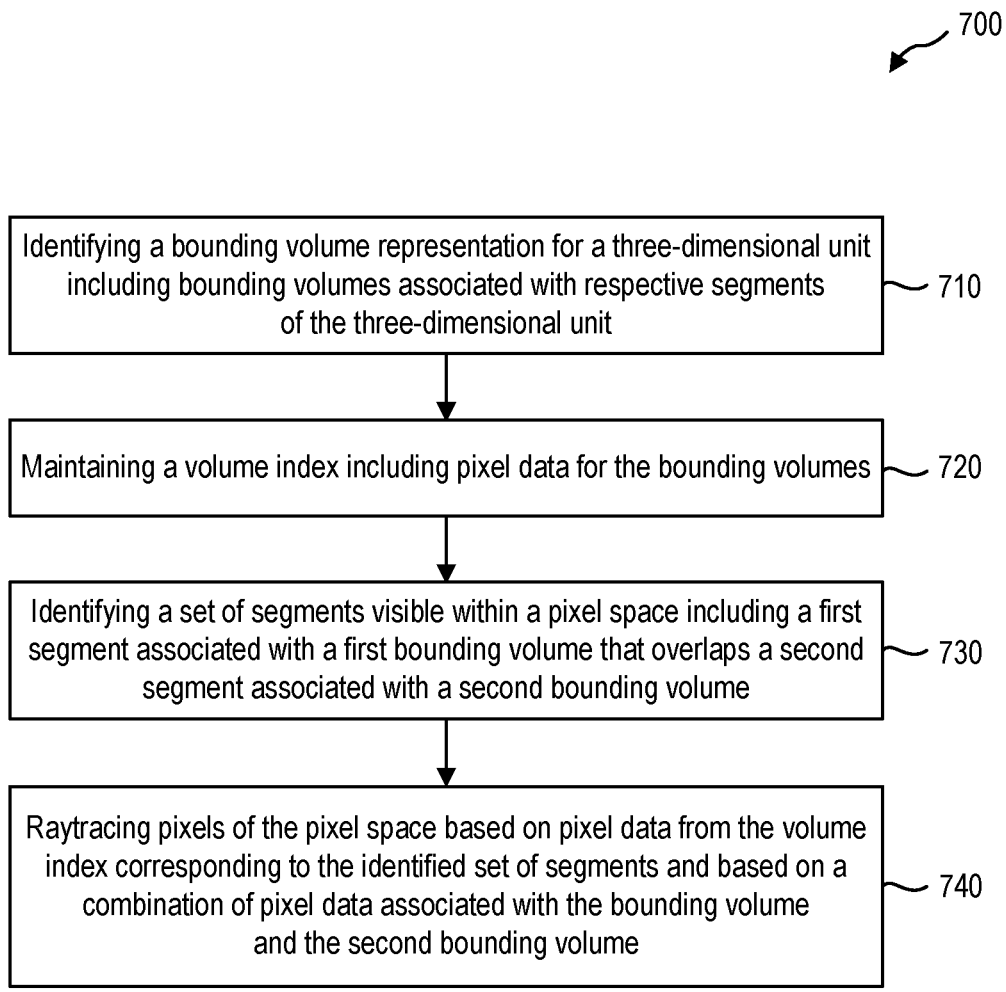
FIG. 7 illustrates another example series of acts for rendering three-dimensional units within a virtual space in accordance with one or more embodiments.

Turning now to FIGS. 6-7, these figures illustrates example flowcharts including series of acts for raytracing pixels of a three-dimensional unit within a virtual space.

While FIGS. 6-7 illustrates acts according to one or more embodiments, alternative embodiments may omit, add to, reorder, and/or modify any of the acts shown in FIGS. 6-7. Moreover, one or more of the individual features and functionalities described in connection with individual acts or series of acts in connection with FIGS. 6-7 may similarly apply to other embodiments and examples described herein. The acts of FIGS. 6-7 can be performed as part of a method. Alternatively, a non-transitory computer-readable medium can include instructions that, when executed by one or more processors, cause a computing device to perform the acts of FIGS. 6-7. In still further embodiments, a system can perform the acts of FIGS. 6-7.

FIG. 6 illustrates a series of acts 600 for rendering three-dimensional images in accordance with one or more embodiments described herein. For example, the series of acts 600 includes an act 610 of identifying a voxel representation for a three-dimensional unit including voxel volumes associated with respective segments of the three-dimensional unit. In one or more embodiments, the act 610 includes identifying a voxel representation for a three-dimensional unit movable within a virtual space where the voxel representation includes a plurality of voxel volumes associated with respective segments from a plurality of segments associated with movement of corresponding portions of the three-dimensional unit.

In one or more embodiments, identifying the voxel representation includes selecting the voxel representation from a plurality of voxel representations associated with the three-dimensional unit. In one or more implementations, the series of acts 600 includes maintaining a plurality of voxel indices for the three-dimensional unit where each voxel index from the plurality of voxel indices corresponds to an associated voxel representation from the plurality of voxel representations. In one or more embodiments, the plurality of voxel volumes includes a plurality of voxel blocks where a granularity of the plurality of voxel blocks is based on a size of the voxel representation when rendered within the pixel space.

In one or more embodiments, each voxel volume of the plurality of voxel volumes includes a plurality of voxel blocks that are bound to a corresponding segment. The plurality of voxel blocks may be configured to move within the virtual space relative to movement of corresponding segments within the virtual space.

The series of acts 600 also includes an act 620 of maintaining a voxel index including pixel data for the voxel volumes. For example, the act 620 may include maintaining a voxel index for the three-dimensional unit where the voxel index includes pixel data for the plurality of voxel volumes mapped to corresponding segments from the plurality of segments. In one or more embodiments, the voxel index includes pixel data for each voxel block across surfaces of the plurality of voxel volumes where the pixel data includes one or more of pixel color data, pixel brightness data, or directional opacity data for the plurality of voxel volumes. In one or more embodiments, the pixel data of the voxel index includes opaqueness values corresponding to respective segments of the plurality of segments where raytracing pixels of the pixel space is further based on the opaqueness values from the voxel index corresponding to the identified set of segments.

The series of acts 600 may also include an act 630 of identifying a set of segments that are visible within a pixel space. For example, the act 630 may include identifying, for a current position of the three-dimensional unit within the virtual space, a set of segments from the plurality of segments that are visible within a pixel space where the pixel space represents a field of view from a reference point within the virtual space.

In one or more embodiments, identifying the set of segments includes identifying two or more overlapping segments associated with two or more voxel volumes that touch a pixel within the pixel space. The series of acts 600 may further include assigning a first identifier of a first segment of the two or more overlapping segments to a first color channel of the pixel and assigning a second identifier of a second segment of the two or more overlapping segments to a second color channel of the pixel.

The series of acts 600 may also include an act 640 of raytracing pixels of the pixel space based on a set of pixel data from the voxel index corresponding to the identified set of segments. For example, the act 640 may include raytracing pixels of the pixel space based on a set of pixel data from the voxel index corresponding to the identified set of segments that are visible to the reference point within the virtual space. In one or more embodiments, raytracing pixel includes identifying a first one or more pixel values from the voxel index based on the first segment, identifying a second one or more pixel values from the voxel index based on the second segment, and filling the pixel based on a combination of the first one or more pixel values and the second one or more pixel values from the voxel index.

In one or more embodiments, identifying the set of segments that are visible within the pixel space and raytracing pixels of the pixel space are performed upon initiating runtime of an application. In addition, the voxel representation and the voxel index may be stored on a computing device prior to initiating runtime of the application.

In one or more embodiments, the series of acts 600 includes detecting an updated position of the three-dimensional unit within the virtual space. The series of acts 600 may further include in response to detecting the updated position of the three-dimensional unit within the virtual space: identifying, for the updated position of the three-dimensional unit, an updated set of segments from the plurality of segments that are visible within the pixel space from the field of view of the reference point within the virtual space and raytracing pixels of the pixel space based on pixel data from the voxel index corresponding to the updated set of segments. Detecting the updated position of the three-dimensional unit may be based on one or more of movement of the three-dimensional unit within the virtual space, movement of the reference point within the virtual space, or rotation of the field of view about the reference point within the virtual space.

The series of acts 600 may further include identifying an additional three-dimensional unit and rendering a display of the additional three-dimensional unit in a variety of ways. For example, the series of acts 600 may include determining that a size of the additional three-dimensional unit within the pixel space exceeds a threshold size. The series of acts 600 may also include, based on determining that the size of the additional three-dimensional unit exceeds the threshold size, filling pixels of the pixel space based on a polygonal mesh representation of the three-dimensional unit.

FIG. 7 illustrates a series of acts 700 for rendering three-dimensional images in accordance with one or more embodiments described herein. For example, the series of acts 700 includes an act 710 of identifying a bounding volume representation for a three-dimensional unit including bounding volumes associated with respective segments of the three-dimensional unit. In one or more embodiments, the act 710 includes identifying a voxel representation for a three-dimensional unit movable within a virtual space where the voxel representation includes a plurality of voxel volumes associated with respective segments from a plurality of segments associated with movement of corresponding portions of the three-dimensional unit.

The series of acts 700 may also include an act 720 of maintaining a volume index including pixel data for the bounding volumes. For example, in one or more embodiments, the act 720 includes maintaining a voxel index for the three-dimensional unit, the voxel index including pixel data for the plurality of voxel volumes and mapped to corresponding segments from the plurality of segments.

The series of acts 700 may also include an act 730 of identifying a set of segments visible within a pixel space including a first segment associated with a first bounding volume that overlaps a second segment associated with a second bounding volume. For example, the act 730 may include identifying, for a current position of the three-dimensional unit within the virtual space, a set of segments from the plurality of segments that are visible within a pixel space representative of a field of view from a reference point within the virtual space where the set of segments includes a first segment associated with a first voxel volume that overlaps at least a portion of a second segment associated with a second voxel volume.

In one or more embodiments, the series of acts 700 includes identifying a subset of pixels of the pixel space corresponding to overlapping portions of the first voxel volume and the second voxel volume. For each pixel of the subset of pixels, the series of acts 700 may include assigning a first identifier of the first segment to a first color channel of the pixel and assigning a second identifier of the second segment to a second color channel of the pixel.

The series of acts 700 may also include an act 740 of raytracing pixels of the pixel space based on pixel data from the volume index corresponding to the identified set of segments and based on a combination of pixel data associated with the first bounding volume and the second bounding volume. For example, the act 740 may include raytracing pixels of the pixel space based on a set of pixel data from the voxel index corresponding to the identified set of segments where raytracing the pixels for a portion of the pixel space where the portion of the first segment and the second segment overlap is based on a combination of pixel data for the first voxel volume and the second voxel volume. In one or more embodiments, raytracing pixels of the pixel space includes casting pixels for the identifier subset of pixels based on a combination of a first one or more pixel values from the voxel index for the first identifier and a second one or more pixel values from the voxel index for the second identifier.

In one or more embodiments, the series of acts 700 includes detecting movement of the three-dimensional unit within the virtual space. The series of acts 700 may also include determining an updated position of the three-dimensional unit within the virtual space. In response to detecting the updated position of the three-dimensional unit within the virtual space, the series of acts 700 may include identifying, for the updated position of the three-dimensional unit within the virtual space, an updated set of segments from the plurality of segments that are visible within the pixel space from the field of view of the reference point within the virtual space and raytracing pixels of the pixel space based on pixel data from the voxel index corresponding to the updated set of segments.

Figure 8:
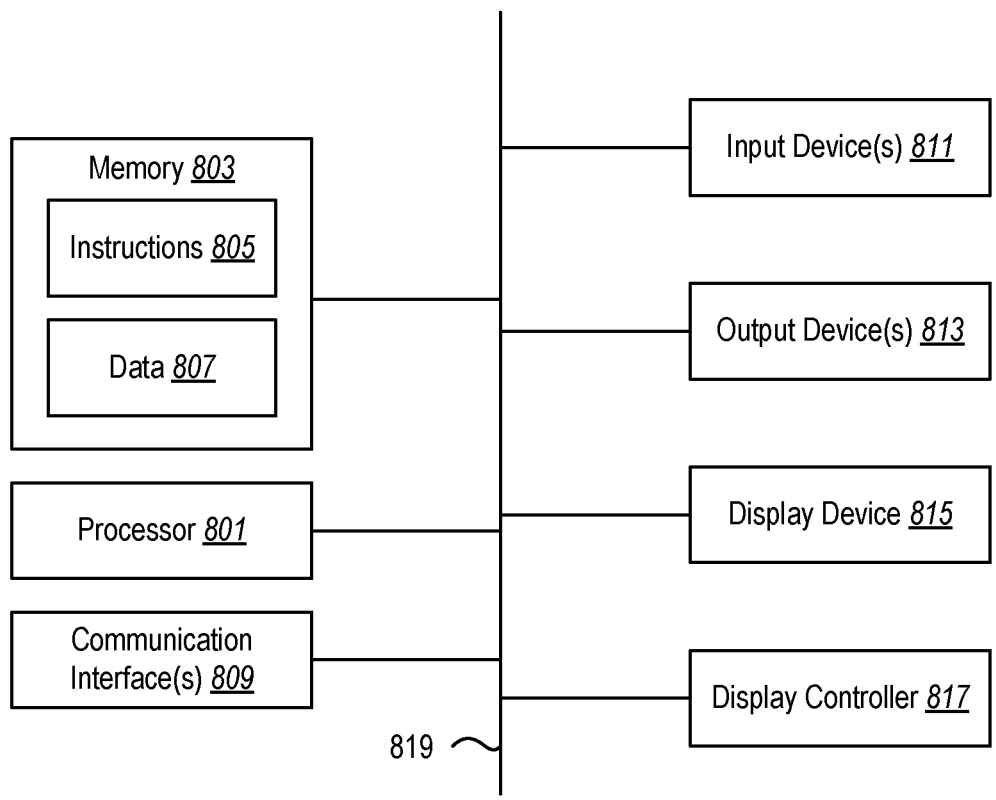
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   identifying a voxel representation for a three-dimensional unit movable within a virtual space, the voxel representation comprising a plurality of voxel volumes, each of the plurality of voxel volumes including multiple voxel blocks, and wherein each voxel volume of the plurality of voxel volumes is associated with a respective segment from a plurality of segments, the plurality of respective segments being associated with movement of corresponding portions of the three-dimensional unit, wherein each voxel volume of the plurality of voxel volumes includes a plurality of voxel blocks that are bound to a corresponding segment, and wherein the plurality of voxel blocks are configured to move within the virtual space relative to movement of corresponding segments within the virtual space;
   maintaining a voxel index for the three-dimensional unit, the voxel index including pixel data for the plurality of voxel volumes and mapped to corresponding segments from the plurality of segments;
   identifying, for a current position of the three-dimensional unit within the virtual space, a set of segments from the plurality of segments that are visible within a pixel space, wherein the pixel space represents a field of view from a reference point within the virtual space; and
   raytracing pixels of the pixel space based on a set of pixel data from the voxel index corresponding to the identified set of segments that are visible to the reference point within the virtual space.

2. The method of claim 1, wherein identifying the voxel representation comprises selecting the voxel representation from a plurality of voxel representations associated with the three-dimensional unit.

3. The method of claim 2, further comprising maintaining a plurality of voxel indices for the three-dimensional unit, wherein each voxel index from the plurality of voxel indices corresponds to an associated voxel representation from the plurality of voxel representations.

4. The method of claim 1, wherein a granularity of the plurality of voxel blocks is based on a size of the voxel representation when rendered within the pixel space.

5. The method of claim 1, wherein the voxel index includes pixel data for each voxel block across surfaces of the plurality of voxel volumes, the pixel data including one or more of pixel color data, pixel brightness data, or directional opacity data for the plurality of voxel volumes.

6. The method of claim 1, wherein identifying the set of segments comprises identifying two or more overlapping segments associated with two or more voxel volumes that touch a pixel within the pixel space, further comprising:
   assigning a first identifier of a first segment of the two or more overlapping segments to a first color channel of the pixel; and
   assigning a second identifier of a second segment of the two or more overlapping segments to a second color channel of the pixel.

7. The method of claim 6, wherein raytracing pixels of the pixel space comprises:
   identifying a first one or more pixel values from the voxel index based on the first segment;
   identifying a second one or more pixel values from the voxel index based on the second segment; and
   filling the pixel based on a combination of the first one or more pixel values and the second one or more pixel values from the voxel index.

8. The method of claim 1, wherein the pixel data of the voxel index includes opaqueness values corresponding to respective segments of the plurality of segments, and wherein raytracing pixels of the pixel space is further based on the opaqueness values from the voxel index corresponding to the identified set of segments.

9. The method of claim 1, wherein identifying the set of segments that are visible within the pixel space and raytracing pixels of the pixel space are performed upon initiating runtime of an application, wherein the voxel representation and the voxel index are stored on a computing device prior to initiating runtime of the application.

10. The method of claim 1, further comprising:
   detecting an updated position of the three-dimensional unit within the virtual space; and in response to detecting the updated position of the three-dimensional unit within the virtual space:
  identifying, for the updated position of the three-dimensional unit, an updated set of segments from the plurality of segments that are visible within the pixel space from the field of view of the reference point within the virtual space; and
  raytracing pixels of the pixel space based on pixel data from the voxel index corresponding to the updated set of segments.

11. The method of claim 10, wherein detecting the updated position of the three-dimensional unit is based on one or more of:
  movement of the three-dimensional unit within the virtual space;
  movement of the reference point within the virtual space; or
  rotation of the field of view about the reference point within the virtual space.

12. The method of claim 1, further comprising:
  identifying an additional three-dimensional unit;
  determining that a size of the additional three-dimensional unit within the pixel space exceeds a threshold size; and
  based on determining that the size of the additional three-dimensional unit exceeds the threshold size, filling pixels of the pixel space based on a polygonal mesh representation of the three-dimensional unit.

13. A method, comprising:
  identifying a voxel representation for a three-dimensional unit movable within a virtual space, the voxel representation comprising a plurality of voxel volumes associated with respective segments from a plurality of segments associated with movement of corresponding portions of the three-dimensional unit;
  maintaining a voxel index for the three-dimensional unit, the voxel index including pixel data for the plurality of voxel volumes and mapped to corresponding segments from the plurality of segments;
  identifying, for a current position of the three-dimensional unit within the virtual space, a set of segments from the plurality of segments that are visible within a pixel space representative of a field of view from a reference point within the virtual space, wherein the set of segments includes a first segment associated with a first voxel volume that overlaps at least a portion of a second segment associated with a second voxel volume; and
  raytracing pixels of the pixel space based on a set of pixel data from the voxel index corresponding to the identified set of segments, wherein raytracing the pixels for a portion of the pixel space where the portion of the first segment and the second segment overlap is based on a combination of pixel data for the first voxel volume and the second voxel volume.

14. The method of claim 13, further comprising:
  identifying a subset of pixels of the pixel space corresponding to overlapping portions of the first voxel volume and the second voxel volume; and
  for each pixel of the subset of pixels:
    assigning a first identifier of the first segment to a first color channel of the pixel;
    assigning a second identifier of the second segment to a second color channel of the pixel.

15. The method of claim 14, wherein raytracing pixels of the pixel space comprises casting pixels for the identifier subset of pixels based on a combination of a first one or more pixel values from the voxel index for the first identifier and a second one or more pixel values from the voxel index for the second identifier.

16. The method of claim 13, further comprising:
  detecting movement of the three-dimensional unit within the virtual space;
  determining an updated position of the three-dimensional unit within the virtual space; and
  in response to detecting the updated position of the three-dimensional unit within the virtual space:
    identifying, for the updated position of the three-dimensional unit within the virtual space, an updated set of segments from the plurality of segments that are visible within the pixel space from the field of view of the reference point within the virtual space; and
    raytracing pixels of the pixel space based on pixel data from the voxel index corresponding to the updated set of segments.

17. A system, comprising:
  one or more processors;
  a memory in electronic communication with the one or more processors; and
  instructions stored in the memory, the instructions being executable by the one or more processors to:
    identify a bounding volume representation for a three-dimensional unit movable within a virtual space, the bounding volume representation comprising a plurality of bounding volumes, each of the plurality of bounding volumes including multiple voxel blocks, and wherein each bounding volume of the plurality of bounding volumes is associated with a respective segment from a plurality of segments, the plurality of respective segments being associated with movement of corresponding portions of the three-dimensional unit, wherein each voxel volume of the plurality of voxel volumes includes a plurality of voxel blocks that are bound to a corresponding segment, and wherein the plurality of voxel blocks are configured to move within the virtual space relative to movement of corresponding segments within the virtual space;
    maintain a volume index for the three-dimensional unit, the volume index including pixel data for the plurality of bounding volumes and mapped to corresponding segments from the plurality of segments;
    identify, for a current position of the three-dimensional unit within the virtual space, a set of segments from the plurality of segments that are visible within a pixel space, wherein the pixel space represents a field of view from a reference point within the virtual space; and
    raytrace pixels of the pixel space based on a set of pixel data from the volume index corresponding to the identified set of segments that are visible to the reference point within the virtual space.

18. The system of claim 17, further comprising instructions that, when executed by the at least one processor, causes the computing device to generate a plurality of bounding volume representations of different sizes and having different levels of detail for the three-dimensional unit, wherein identifying the bounding volume representation comprises selecting the bounding volume representation from the plurality of bounding volume representations based on a size of the bounding volume representation when rendered within the pixel space.

19. The system of claim 17, wherein identifying the set of segments comprises identifying two or more overlapping segments associated with two or more bounding volumes that touch a pixel within the pixel space, and wherein raytracing pixels of the pixel space is based on a combination of pixel values from the volume index corresponding to the two or more overlapping segments.

* * * * *